June 25, 1957 — R. GROSSE-LOHMANN — 2,796,763
CRITICAL AERODYNAMIC LIMIT INDICATOR
Filed Dec. 18, 1952

Inventor
RALPH GROSSE-LOHMANN

United States Patent Office 2,796,763
Patented June 25, 1957

2,796,763
CRITICAL AERODYNAMIC LIMIT INDICATOR

Ralph Grosse-Lohmann, Montgomery County, Md.

Application December 18, 1952, Serial No. 326,805

6 Claims. (Cl. 73—178)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in aircraft instrumentation, and it is an object of this invention to provide a single instrument for determining the instantaneous relation of an airplane's performance in flight, to its critical aerodynamic limits at any condition of gross weight, attitude, normal acceleration, altitude and flight path.

At the present time no device is available, which can accomplish the purpose for which the various forms of the invention are intended. Flying personnel must memorize the critical aerodynamic limits of an airplane as defined by the V–n diagram (airspeed-normal acceleration diagram with a family of curves for various altitudes) for the particular airplane. They must, while in flight, correlate the conditions of altitude, airspeed, and acceleration as shown by standard flight instruments and the gross weight as estimated from known loading of the airplane, with information contained in the V–n diagram, in order to control the performance of the airplane so as to remain within the design specified limits of the airplane. This procedure is unsatisfactory because the V–n diagram is too complex for a pilot to memorize completely, thus causing him to restrict the operational capabilities of the aircraft for fear of exceeding the critical aerodynamic limits. Such instruments as the Mach meter alone or a maximum allowable airspeed indicator, while useful to a limited extent, do not provide enough information to discard completely the V–n diagram. Accordingly, it is another object of the invention to provide an indicator which uses independent signals of angle of attack and Mach number to actuate hands arranged to cross each other, the point of crossing representing the instant performance of the aircraft, and to provide a curve representing the critical aerodynamic limits for the aircraft, whereby the point of crossing of the hands and hence performance, may be constantly observed in relation to the critical aerodynamic limits.

Another object of the invention is to provide a flexible and displaceable strip representing the critical aerodynamic limit curve, so that it may be adjusted to correspond precisely to the design limits of performance of any aircraft, when used as a part of an instrument.

Ancillary objects and features of importance will become apparent in following the description of the forms of the invention, shown in the accompanying drawing, wherein—

In general, the invention consists of arranging on a common reference base, independent signals of angle of attack and Mach number in relation to predetermined values of critical angle of attack versus critical Mach number of the aircraft in which the instrument is used. For any combination of signals of angle of attack $\alpha$ and Mach number M which fall below the predetermined values of critical angle of attack plotted against critical Mach number, it is known that the airplane is performing within its critical aerodynamic limits. When the combination of signals of angle of attack and Mach number is the same as the value of critical angle of attack versus Mach number, it is known that the aircraft is at its critical aerodynamic limit. When the combination of signals of angle of attack and Mach number is in excess of the values of critical angle of attack plotted against Mach number, it is known that the aircraft has exceeded its critical aerodynamic limit. Since the information provided by this invention is correct and valid for any altitude, gross weight, normal acceleration and attitude, the complex V–n diagram will be no longer necessary and the pilot of the aircraft can, with full confidence, fly the aircraft close to the critical limits, thus in effect, increasing the effectiveness of the aircraft.

Figure 1:
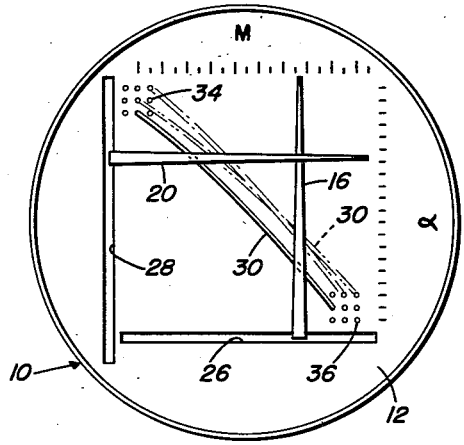
Fig. 1 is a front view of one form of the instrument.
Figure 2:
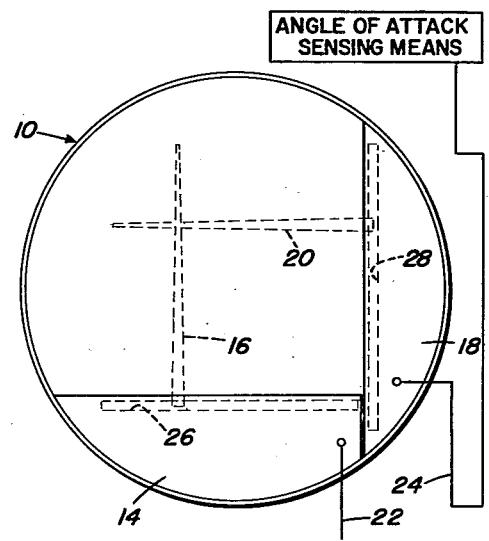
Fig. 2 is a back view of the instrument in Fig. 1, the Mach meter and angle of attack meter connections being shown schematically.

In Figs. 1 and 2 there is a casing 10 provided with a face 12 on which Mach number markings M and angle of attack graduations $\alpha$ are arranged in perpendicular rows. The casing has at least that part 14 of a Mach meter which contains the hand 16, connected with it, and at least that part 18 of an angle of attack meter which contains the hand 20, also connected with it. Suitable connections 22 and 24 for the meters are shown schematically since they are conventional components of these instruments. Slots 26 and 28 for the hands 16 and 20 are provided in the face 12 of the indicator, and the hands 16 and 20 are located in these slots. Since the slots are disposed at right angles to each other and the hands are made sufficiently long, the hands cross each other, the point of crossing being important since such a point indicates the instant performance of the aircraft, that is Mach number versus angle of attack.

Mach number and angle of attack take into consideration all of the variables, such as gross weight, altitude, etc. of importance in defining the aerodynamic limit of an aircraft. Therefore, by providing a curve of critical aerodynamic limits for the aircraft on the face of the indicator, a pilot may at a single glance, see how his craft is flying in relation to safe flying with respect to the capabilities of the aircraft. The curve on the face 12 is formed by a flexible strip 30, such as various metals or plastics, with studs 32 at the ends thereof to fit in the families 34 and 36 of apertures formed in the face 12. Thus the curve may be adjusted both by bending the strip and by locating it in selected apertures. In this way the design or modification of any aircraft may be compensated for in the instrument by adjustment of the critical aerodynamic limit curve.

In operation, the hand 16 and/or the hand 20 is moved in response to normal operation of the Mach meter and angle of attack meter. The point of intersection of these hands represent an instantaneous point on a curve, plotting Mach number against angle of attack. If this point lies below the critical as defined by the curve 30, the pilot knows that his aircraft is being operated safety in so far as aerodynamic performance is concerned. If the intersection point of hands 16 and 20 is above the limit curve 30, the pilot knows that his flying must be altered.

Figure 3:
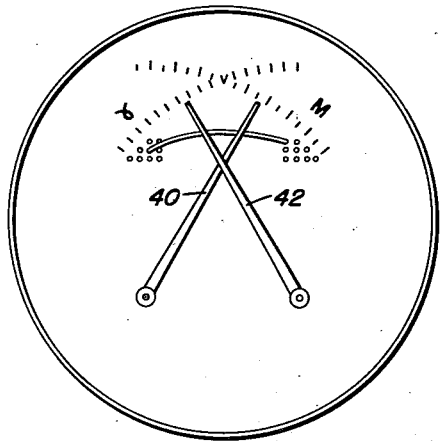
Fig. 3 is a front view of another form of the instrument.
Figure 4:
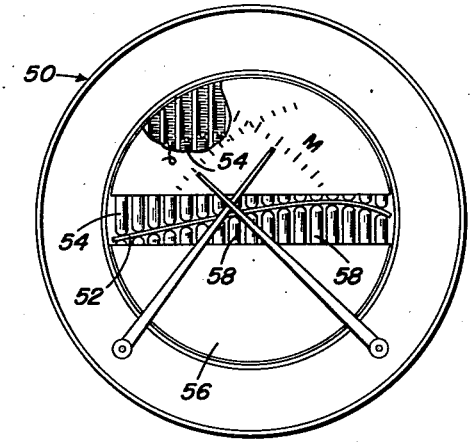
Fig. 4 is a front view of a third embodiment, parts being broken away to show internal structure.
Figure 5:
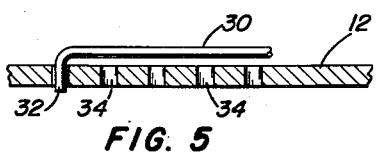
Fig. 5 is an enlarged fragmentary sectional view of the instrument face with the curved strip mounted in one of a number of apertures provided for the strip.

The embodiments of Figs. 3 and 4 are similar to the embodiment of Fig. 1 with respect to operation and also theory of operation. Fig. 3 is presented to show the use of hands 40 and 42 which have a rotary motion due to the structural make-up of the Mach meter and angle of attack meter, instead of linearly movable hands as those shown in Fig. 1. This necessitates the placement of the Mach and angle of attack indicia in arcuate form. The strip 44 and its supporting means are the same as the strip which defines curve 30.

The indicator 50 (Fig. 4) has as its distinguishing feature, the means of supporting the flexible strip 52 for adjustment. An upper row of adjustable members, for example screws 54, are provided in threaded bores provided in the face 56 or in a structural element disposed behind the face. The lower ends of the adjustable members contact the strip 52, while the upper ends of oppositely disposed adjustable members 58 bear against the bottom surface of the strip 52. By adjusting the screws, the curvature and disposition of the strip 52 may be adjusted.

The hands and curves of the various embodiments may be made of different colors to facilitate identification thereof.

It is apparent that various modifications may be made without departing from the scope of the following claims.

What is claimed is:

1. For use on an aircraft, a critical aerodynamic limit indicator comprising a casing provided with a face, a Mach meter having a part thereof disposed in said casing and having a hand movable over said face in response to operation of said meter, an angle of attack meter having a part thereof disposed in said casing and having a hand movable over said face in response to operation of said angle of attack meter, said hands being aranged to cross each other to indicate at their point of intersection simultaneous values of Mach number and angle of attack, means visible from the face side of said casing for indicating the design critical angle of attack and Mach number to provide a reference for correlating the intersection of said hands with respect to allowable aircraft performance as defined by said means, said means comprising a flexible strip extending parallel to and adjacent said face, and arranged with respect to said hands so that the points of crossing of said hands at critical values of angle of attack and Mach number will coincide with said strip.

2. An aircraft instrument comprising the combination of a Mach meter and an angle of attack meter, each of said meters having a hand, a casing supporting the portions of said meters which have said hands, a face in said casing over which said hands are movable, said hands being ararnged on said face to cross each other and the point of crossing being indicative of instantaneous Mach number plotted against angle of attack, and means forming a curve on said face adjacent to said hands for indicating the critical angle of attack plotted against Mach number so that the instantaneous angle of attack versus Mach number as indicated by the crossing point of said hands may be rapidly compared to the critical angle of attack versus Mach number, said means including a strip and separable fasteners at the ends of said strip for securing the strip to said face, said strip being flexible so that the strip may be distorted to provide variations in the curve, said strip being arranged on said face so that the points of crossing of said hands at critical values of angle of attack and Mach number will coincide with said strip.

3. The indicator of claim 1 including means to vary the curvature and inclination of said strip comprising a first and second row of longitudinally displaceable elements disposed in the plane of curve variation, said first row being disposed on one side of and in contact with said strip, said second row being disposed on the other side of and in contact with said strip.

4. For use in an aircraft, the combination which comprises an angle of attack sensing means; a Mach number sensing means; an indicator comprising, a first meter connected to said angle of attack sensing means to be actuated thereby, a second meter connected to said Mach number sensing means to be actuated thereby, each of said meters having a hand, a face having angle of attack and Mach number graduations thereon, means supporting said meters so that said hands are disposed in front of said face in register with said graduations respectively and so that said hands may intersect to indicate simultaneous values of angle of attack and Mach number, means on said face representing the curve of critical values of angle of attack versus Mach number, said means being located on said face with respect to said hands so that the points of intersection of said hands at critical values of angle of attack and Mach number coincide with said curve, said curve means comprising a flexible strip that may be distorted so as to provide variations in the curve to adapt the indicator to various aircraft, and means adjacent said strip to vary the curvature and inclination of said strip in a plane parallel and adjacent to said face.

5. The combination of claim 4 wherein: said curve varying means comprises a separable fastener affixed to each end of said strip and a plurality of receptacle means in said face each adapted to receive one of said separable fasteners.

6. The combination of claim 4 wherein: said curve varying means comprises a first and second row of longitudinally displaceable elements disposed in the plane of curve variation, said first row being disposed on one side of and in contact with said strip, said second row being disposed on the other side and in contact with said strip.

References Cited in the file of this patent

UNITED STATES PATENTS

| | | |
|---|---|---|
| 1,433,536 | Dugit | Oct. 31, 1922 |
| 2,454,630 | Buckthal | Nov. 23, 1948 |
| 2,507,367 | Carbonara et al. | May 9, 1950 |
| 2,559,718 | Goodlett | July 10, 1951 |
| 2,579,902 | Carbonara et al. | Dec. 25, 1951 |

FOREIGN PATENTS

| | | |
|---|---|---|
| 871,563 | France | Jan. 19, 1942 |